United States Patent
Chang et al.

(10) Patent No.: US 7,130,274 B2
(45) Date of Patent: Oct. 31, 2006

(54) METHOD FOR DETECTING CONNECTION POLARITY OF NETWORK TRANSMISSION LINES AND ASSOCIATED DETECTION CIRCUIT

(75) Inventors: Jui-Feng Chang, Tai-Nan (TW); Chu-Yu Hsiao, Tai-Chung (TW)

(73) Assignee: VIA Technologies Inc., Taipei Hsien (TW)

(*) Notice: Subject to any disclaimer, the term of this patent is extended or adjusted under 35 U.S.C. 154(b) by 1094 days.

(21) Appl. No.: 10/064,259

(22) Filed: Jun. 26, 2002

(65) Prior Publication Data

US 2003/0057932 A1   Mar. 27, 2003

(30) Foreign Application Priority Data

Sep. 21, 2001 (TW) ................ 90123374 A

(51) Int. Cl.
*G01R 31/08* (2006.01)
(52) U.S. Cl. .............. 370/242; 370/248; 714/712
(58) Field of Classification Search ............ 370/242, 370/248, 250, 251; 714/712, 715; 375/360, 375/364; 327/18–27, 28–38
See application file for complete search history.

(56) References Cited

U.S. PATENT DOCUMENTS

| | | | | |
|---|---|---|---|---|
| 5,101,401 A * | 3/1992 | Suzuki et al. | ................ | 370/241 |
| 5,107,489 A * | 4/1992 | Brown et al. | ................ | 370/360 |
| 5,249,183 A * | 9/1993 | Wong et al. | ................ | 370/228 |
| 5,268,907 A * | 12/1993 | Suzuki et al. | ................ | 714/712 |
| 5,315,597 A * | 5/1994 | Yang et al. | ................ | 714/712 |
| 5,454,001 A * | 9/1995 | Nagatani et al. | ............ | 714/821 |
| 5,557,220 A * | 9/1996 | Araya et al. | ................ | 327/28 |
| 5,577,023 A * | 11/1996 | Marum et al. | .............. | 370/225 |
| 5,805,597 A * | 9/1998 | Edem | ......................... | 370/445 |
| 5,880,615 A * | 3/1999 | Bazes | ......................... | 327/307 |
| 5,903,613 A * | 5/1999 | Ishida | ......................... | 375/340 |
| 6,160,851 A * | 12/2000 | Brown et al. | ................ | 375/254 |
| 6,160,852 A * | 12/2000 | Grube et al. | ................ | 375/256 |
| 6,320,940 B1 * | 11/2001 | Oi | ........................... | 379/27.01 |
| 6,460,078 B1 * | 10/2002 | Dove et al. | ................ | 709/220 |
| 6,469,547 B1 * | 10/2002 | Rabii | ........................ | 327/74 |
| 6,684,347 B1 * | 1/2004 | Coffey | ........................ | 714/43 |
| 6,771,675 B1 * | 8/2004 | Cao et al. | .................... | 370/537 |
| 7,039,711 B1 * | 5/2006 | Hsu et al. | .................. | 709/228 |
| 2004/0198105 A1 * | 10/2004 | Dove | ........................ | 439/894 |

* cited by examiner

*Primary Examiner*—Hassan Kizou
*Assistant Examiner*—Habte Mered
(74) *Attorney, Agent, or Firm*—Winston Hsu

(57) ABSTRACT

A method and associated detecting circuitss for detecting and correcting a connection polarity of a network transmission line include two network clients and a network transmission line. One network client utilizes a detecting circuit to count and compare the number of signal pulses at the receiving and transmitting ports to determine if the connection polarity is correct or inverted. The detecting circuit can switch the connection polarity if required to correct it.

11 Claims, 5 Drawing Sheets

METHOD FOR DETECTING CONNECTION POLARITY OF NETWORK TRANSMISSION LINES AND ASSOCIATED DETECTION CIRCUIT

BACKGROUND OF INVENTION

1. Field of the Invention

The present invention relates to a method and associated detecting circuits for detecting connection polarity of network transmission lines, and more particularly, to a method and associated detection circuits for detecting and correcting the connection polarity of network transmission lines by counting the number of signal pulses.

2. Description of the Prior Art

In a modern, information based society, computer networks allow people to exchange information. Hence, the manufacture and maintenance of these computer networks is an important issue.

Please refer to FIG. 1A. FIG. 1A is a schematic diagram of a connection between two network clients 12A and 12B via a network transmission line 14. The clients 12A and 12B can be a switch, a router, a terminal of a network system, or other types of network clients. The transmission media between these two clients can be an Ethernet, in which the network transmission line 14 is typical Ethernet transmission cable. The connection port of each client has two ports, a transmitting port and a receiving port, for exchanging information via the network transmission line 14. A transmitting port Tx0 and a receiving port Rx0 are provided in the client 12A, whereas a transmitting port Tx1 and a receiving port Rx1 are provided in the client 12B. Each port transmits or receives, for example, a differential signal by a pair of wires inside the network transmission line 14. Under a correct connection, the transmitting port Tx0 of the client 12A connects to the receiving port Rx1 of the client 12B and the receiving port Rx0 of the client 12A connects to the transmitting port Tx1 of the client 12B via the network transmission line 14, as shown in FIG. 1A, so as to provide a correct connection polarity. If the connection polarity is correct then the two clients 12A and 12B can communicate properly.

In practical situations, it happens that the connection polarity of the network transmission line 14 connected between the clients 12A and 12B is inverted. Please refer to FIG. 1B. FIG. 1B is a schematic diagram of the network system shown in FIG. 1A but with inverted connection polarity. That is, the transmitting port Tx1 of the client 12B connects to the transmitting port Tx0 of the client 12A instead of the receiving port Rx0. Similarly, the receiving port Rx1 of the client 12B does not correctly connect to the corresponding transmitting port Tx0 of the client 12A instead of the receiving port Rx0. Thus, the receiving ports Rx0 and Rx1 of the clients 12A and 12B will not receive any meaningful signals, since the network system malfunctions.

SUMMARY OF INVENTION

It is therefore a primary object of the invention to provide a method and associated detecting circuits for detecting and correcting the connection polarity of network transmission lines so as to guarantee that a network system functions normally.

According to the invention, a method for detecting a connection polarity of a network transmission line comprises a connection port counting a first number of signals transmitted via a first transmission line during a predetermined interval and counting a second number of signals transmitted via a second transmission line during a predetermined interval. The connection port determines that the connection polarity of the network transmission line is correct when a difference between the first number and the second number is less than a threshold value. Conversely, the connection port determines that the connection polarity of the network transmission line is inverted when a difference between the first number and the second number is greater than a threshold value.

It is an advantage of the claimed invention that the above method and the associated detecting circuitss can detect and correct the connection polarity of a network transmission line to guarantee that information can be shared on the network.

These and other objects of the claimed invention will no doubt become obvious to those of ordinary skill in the art after reading the following detailed description of the preferred embodiment that is illustrated in the various figures and drawings.

DETAILED DESCRIPTION

Several kinds of encoded digital signals, with different voltage levels, can be used to transmit signals across a network. Consider an Ethernet 100 Base-T MLT-3 signal as an example. A high voltage level signal A represents a digital "1", a middle voltage level signal A represents a digital "0", and a low voltage level signal A represents a digital "−1". A reference voltage level is set at first. A signal pulse is triggered at a client if the voltage level of a signal on a network transmission line is higher than the reference voltage level. For example, if the reference voltage level is set as the high voltage level reference, each high voltage level signal will correspondingly trigger a signal pulse. A number of signal pulses triggered by a digital signal associates to a flow rate of the digital signal.

Figure 1A:
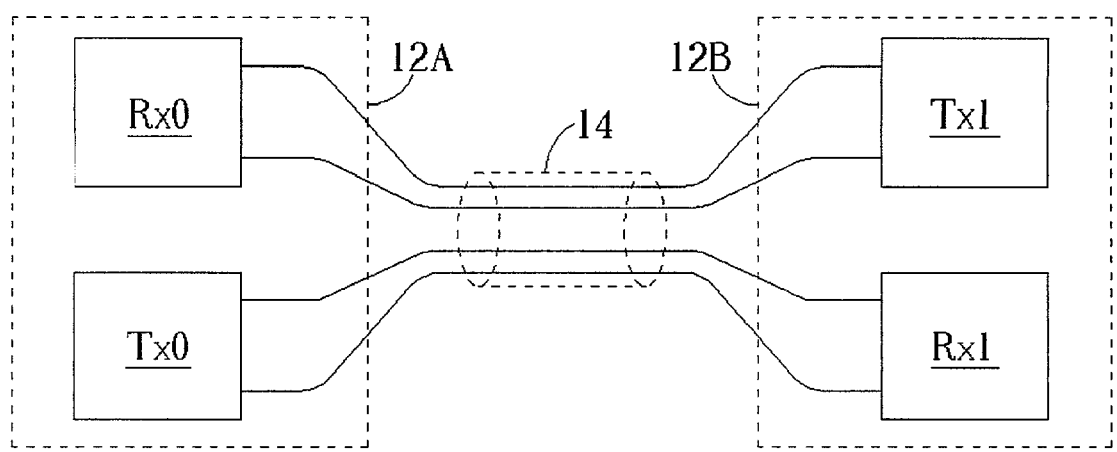
FIG. 1A is a schematic diagram of a connection between two clients via a network transmission line.
Figure 2:
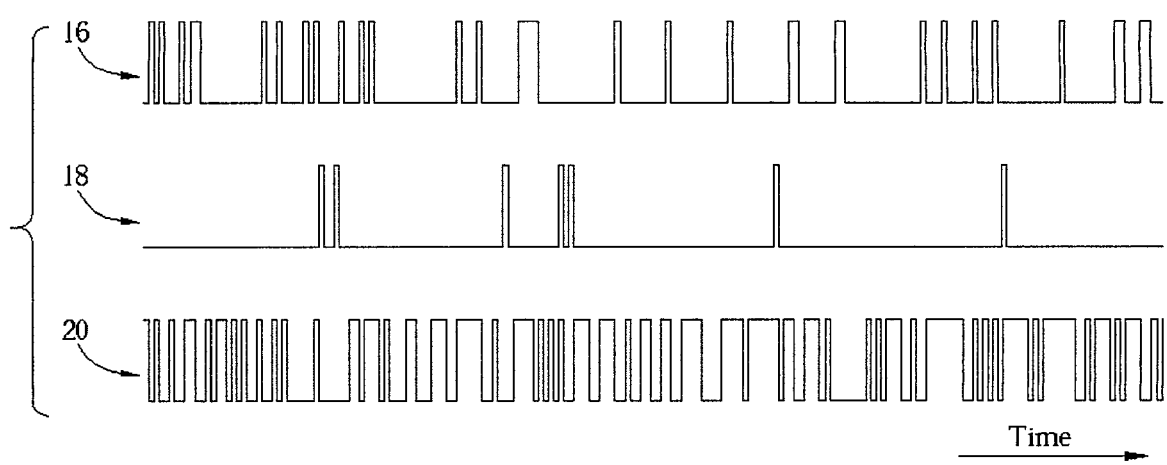
FIG. 2 shows waveforms of signal pulses triggered by transmission signals on a network transmission line when the network transmission line is connected in different ways.

The present invention determines and corrects the connection polarity of a network transmission line by utilizing the quantity and the frequency of signal pulses. Shown in FIG. 2 are three waveforms of signal pulses triggered by transmission signals on a network transmission line. The horizontal-axis of each waveform represents time and the vertical-axis is the amplitude of signal. If clients 12A and 12B of a network system are correctly connected, as shown in FIG. 1A, the waveform of signal pulses triggered by transmission signals on each line of the network transmission line will appear approximately like the waveform 16. Typically, the transmitting port of each client transmits nearly the same flow rate of digital signals to the corresponding receiving port of the other client.

Figure 1B:
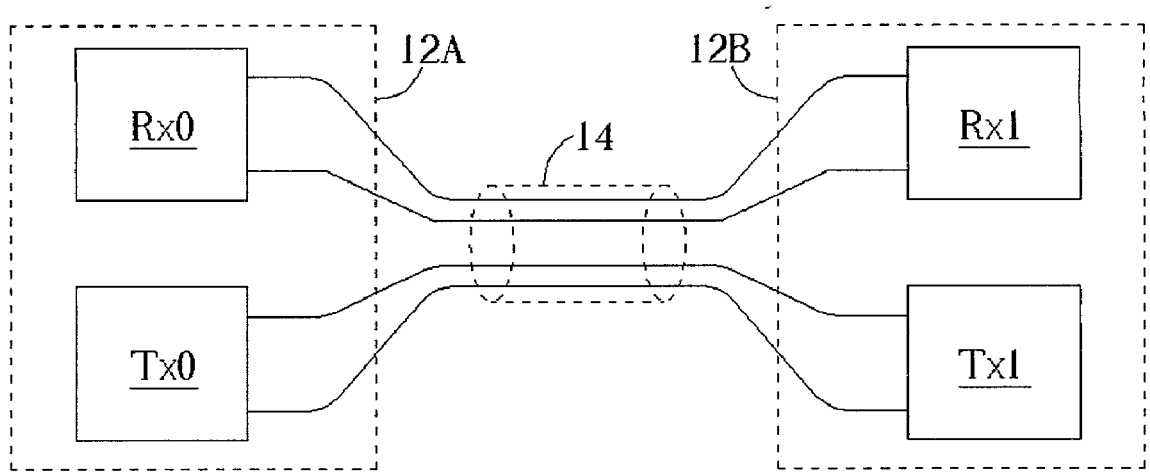
FIG. 1B is a schematic diagram of the network system shown in FIG. 1A wherein the connection polarity is inverted.

On the contrary, when the connection polarity of the network transmission line is inverted as shown in FIG. 1B, a measurable difference appears in the number of signal pulses triggered. Because the connection polarity of the network transmission line is inverted, the waveform of signal pulses appearing on the line connected between the two receiving ports looks like the waveform 18 shown in FIG. 2. The frequency of the triggered signal pulses on the line is very low because both ends of the line are receiving ports that will not transmit any signal. The only signals actually seen on the line are generated by noise or interference, such as lightening. On the other hand, the line connecting the two transmitting ports is filled with signals as both transmitting ports are attempting to transmit, illustrated as the waveform 20 in FIG. 2. In other words, when the connection polarity of a network system is inverted, the number of signal pulses on the line connected between two transmitting ports is very large, and the number of signal pulses on the line connected between two receiving ports is very small. When the connection polarity of a network system is correct, the number of signal pulses on each line lies between these previous two numbers.

Figure 3:
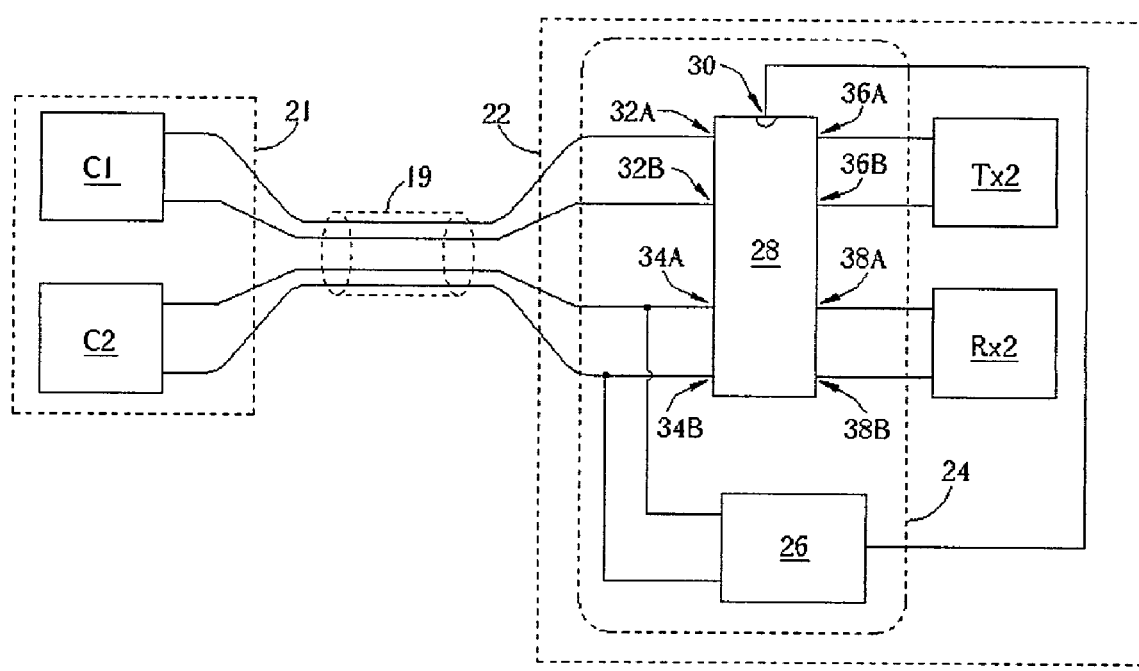
FIG. 3 is a circuit schematic diagram for detecting and correcting the polarity of a network transmission line according to a preferred embodiment of the present invention.

Please refer to FIG. 3. FIG. 3 is a circuit schematic diagram of a preferred embodiment according to the present invention for detecting and correcting the connection polarity of a network system. Two clients 21 and 22 connected by the transmission line 19 form a typical network system. A detecting circuit is installed in the client 22. The clients can be a switch, a router, a terminal, or other types of network clients. The network system formed by the network transmission line 19 can be an Ethernet system. The client 21 comprises two ports C1 and C2 each connected to a line (a pair of wires as shown in FIG. 3) of the network transmission line 19 for transmission of mutually counter-phased differential-form transmission signals. The client 22 also comprises two ports; one being a transmitting port Tx2 and the other being a receiving port Rx2. A detecting circuit 24, installed in the client 22, comprises a counter 26 and a multiplexer 28. The counter 26, connects to one line (two wires) of the network transmission line 19, receives differential-form transmission signals on the line and counts a number of signal pulses. The counter 26 also sends a control signal to the multiplexer 28 via a control end 30 of the multiplexer 28. The multiplexer 28 comprises two differential input ports, 32A and 32B (a first differential input pair) and 34A and 34B (a second differential input pair). The multiplexer also comprises two differential output ports, 36A and 36B (a first differential output pair) and 38A and 38B (a second differential output pair). The multiplexer 28 can switch the differential input pairs to connect with different differential output pairs based on the control signal generated by the counter 26.

FIG. 3 also shows that the input ports 32A and 32B of the multiplexer 28 connect to the port C1 of the client 21 whereas the output ports 36A and 36B connect to the transmitting port Tx2. The other input ports 34A and 34B connect to the port C2 of the client 21 via the network transmission line 19 whereas the output ports 38A and 38B connect to the receiving port Rx2. The present invention can detect and correct the connection polarity of a network system using the detecting circuit 24 installed on one client 22 regardless of if the port C1 or C2 of the other client 21 is a transmitting port or a receiving port.

The operation of the detecting circuit 24 of the preferred embodiment of the present invention is described as follows. The multiplexer 28 connects the first and second input pairs respectively to the first and second output pairs such that, the port C1 connects to the transmitting port Tx2 and the port C2 connects to the receiving port Rx2. The counter 26 then counts the number of signal pulses on the line connected between the port C2 and the receiving port Rx2. Practically, the counter 26 comprises a comparator for comparing a voltage level of transmission signals with a predetermined voltage level and a Schmitt trigger for generating signal pulses. For example, if the voltage level of transmission signal exceeds the predetermined voltage level, the Schmitt trigger will trigger a signal pulse. The Schmitt trigger can suppress the glitch interference.

The counter 26 determines the connection polarity of the network transmission line according to the quantity and the frequency of signal pulses. As discussed previously, a very small number of signal pulses, less than a threshold value, received by the counter 26, shown as waveform 18 in FIG. 2, indicates that the port C2 of the client 21 does not transmit any meaningful signal and is in fact a receiving port. In other words, the two receiving ports C2 and Rx2 are connected. Therefore the counter 26 generates a control signal to the control end 30 of the multiplexer 28 causing the multiplexer 28 to switch the connection polarity for input pairs and output pairs. As a result, the port C2 of the client 21 connects correctly to the transmitting port Tx2 of the client 22 and the port C1 of the client 21 also correctly connects to the receiving port Rx2 of the client 22.

If the connection polarity is correct then the number of signal pulses received by the counter 26 will exceed the threshold value. The counter 26 thus determines that the connection polarity of the network transmission line 19 is correct. Of course, the counter 26 will not assert a control signal to the multiplexer 28 to switch the connection polarity of the first and the second input and output pairs. Generally, if the number of signal pulses received by the counter 26 is smaller than a predetermined threshold value, set according to a flow rate of digital signals of normal transmission signals, the connection polarity of the network transmission line 19 is determined to be inverted.

Figure 4:
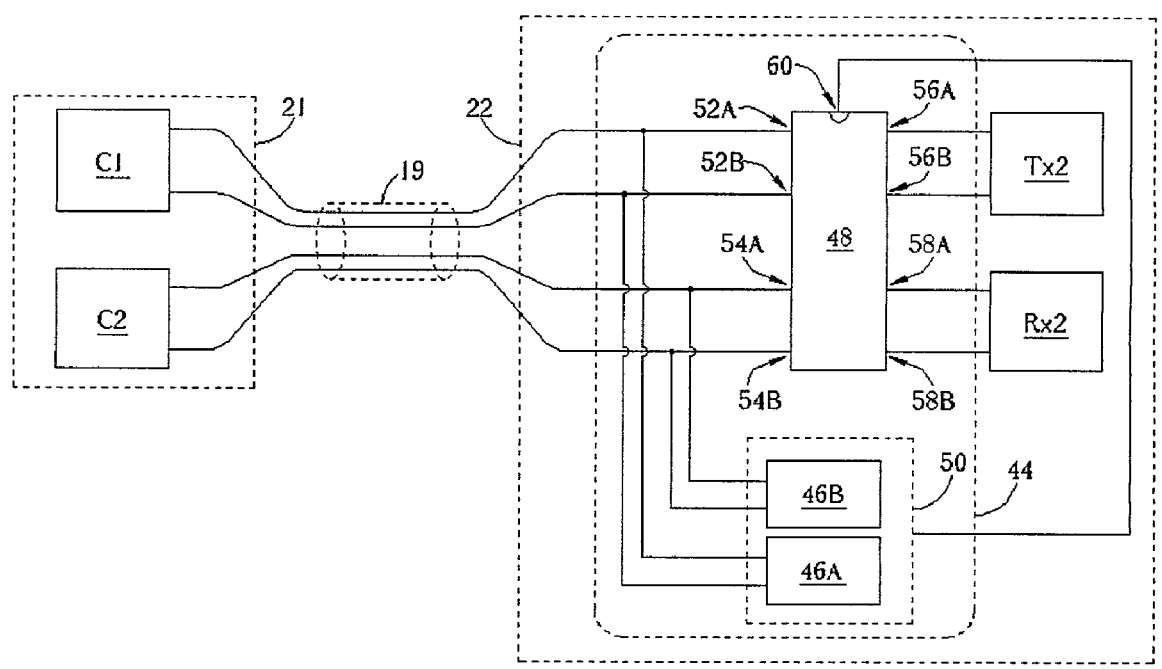
FIG. 4 is a schematic diagram of another embodiment according to the present invention.

Please refer to FIG. 4. FIG. 4 is a schematic diagram of another embodiment 44 according to the present invention. Similar to the network system shown in FIG. 3, the client 21 connects to the client 22 via the network transmission line 19. The client 21 comprises two ports C1 and C2 whereas the other client 22 comprises a detecting circuit 44, transmitting port Tx2, and a receiving port Rx2. The detecting circuit 44 comprises a counter 50 and a multiplexer 48. The multiplexer 48, similar to the first embodiment, is connected between the network transmission line 19, and the transmitting port Tx2 and receiving port Rx2. The multiplexer 48 has a first differential input pair (input port 52A and 52B), a second differential input pair (input port 54A and 54B), a first differential output pair (output port 56A and 56B), and a second differential output pair (output port 58A and 58B). The two pairs of input and output ports can be switched in response to a control signal, transmitted from the counter 50, of a control end 60. The counter 50 comprises two counting units 46A and 46B. The counting unit 46A counts the number of signal pulses on the first differential input pair whereas the counting unit 46B counts the number of signal pulses on the second differential input pair. The counter 50 determines the connection polarity of the network transmission line 19 in response to a counting result of the counting units 46A and thus controls the multiplexer 48 via the control end 60 to properly connect the network transmission line 19 with the transmitting port Tx2 and receiving port Rx2.

The present invention can detect and further correct the connection polarity of network transmission line 19 by the detecting circuit 44 installed in the client 22 regardless of if the port C1 or C2 of the other client 21 is a transmitting port or a receiving port. Suppose that initially the ports C1 and C2 of client 21 are connected through the multiplexer 48 to transmitting port Tx2 and receiving port Rx2 respectively. The counting units 46A and 46B count the number of signal pulses on the lines between the port C1 and the transmitting port Tx2, and the port C2 and the receiving port Rx2 respectively. The counter 50 compares the transition numbers of signals of the counting units 46A and 46B, and any significant difference between these numbers of signals, as illustrated by the waveforms 18 and 20 in FIG. 2, means that the port C1 is a transmitting port and the port C2 is a receiving port, so the connection polarity is inverted. A relative too large transition numbers of signals at a counting unit than the other transition number represents that the two ports connected at both ends of the line are transmitting ports, while the other two ports connected at both ends of the line are receiving ports. After determining an incorrect connection polarity, the counter 50 will control the multiplexer 48 to switch the connection polarity between the input pairs and the output pairs. That is, the input ports 52A and 52B will be connected to the output ports 58A and 58B, and the input ports 54A and 54B will be connected to the outputs port 56A and 56B. Thus, the determined transmitting port C1 will be correctly connected to the receiving port Rx2 and the determined receiving port C2 will likewise be correctly connected to the transmitting port Tx2.

On the other hand, if the numbers of signals at counting units 46A and 46B are almost equal, then the connection polarity of the network transmission lines 19 will be taken as correct. That is, port C1 is the receiving port and the port C2 is the transmitting port of the client 21. According to this comparison result for the two counting units, the counter 50 determines that the connection polarity of the network transmission line 19 is correct and, of course, needs not to switch the connection state of the multiplexer 48.

Practically, if the difference between the totals counted by the two counting units 46A and 46B exceeds a predetermined value, set according to the characteristic of the network signals, the connection polarity is inverted. If the difference between these two totals is not large enough to exceed the predetermined value, the connection polarity is correct. Each counting unit (46A and 46B) can comprise a comparator for comparing voltage levels of transmission signals with a predetermined voltage level, and a Schmitt trigger for generating signal pulses. According to the comparison, the Schmitt trigger can further prevent glitches.

In contrast to the prior art, the present invention provides a method and related apparatus for detecting the connection polarity of a network transmission line so that an inverted connection polarity of the transmission line can be corrected.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting a connection polarity of a network transmission line, one terminal of the network transmission line connected to a connection port, the network transmission line comprising a first transmission line and a second transmission line; the method comprising:
   the connection port counting a first number of signals transmitted via the first transmission line during a predetermined interval;
   the connection port counting a second number of signals transmitted via the second transmission line during said predetermined interval;
   the connection port determining that the connection polarity of the network transmission line is correct when a difference between the first number and the second number is less than a first threshold value; and
   the connection port determining that the connection polarity of the network transmission line is inverted when a difference between the first number and the second number is greater than a second threshold value.

2. The method of claim 1 further comprising switching the first transmission line and the second transmission line connected to the connection port when the connection polarity of the network transmission line is inverted.

3. The method of claim 1 wherein the network transmission line is used for transmitting a 100Base-T signal.

4. The method of claim 3 wherein the 100Base-T signal is an MLT-3 coded signal.

5. The method of claim 1 further comprising comparing voltage levels of signals transmitted via the network transmission line with a predetermined level for generating the first number and the second number.

6. The method of claim 1 further comprising transforming each signal transmitted via the network transmission line into a pulse signal for counting the first number and the second number.

7. The method of claim 6 wherein said transforming step comprises using a Schmitt trigger for transforming each signal transmitted via the network transmission line into the pulse signal.

8. A detection circuit for detecting a connection polarity of a network transmission line of a receiver terminal having a receiving terminal and a transmitting terminal, the detection circuit comprising:
   a first counter for counting a first number of signals received by the receiving terminal of the receiver terminal;
   a second counter for counting a second number of signals received by the transmitting terminal of the receiver terminal;
   a multiplexer for coupling the network transmission line with the receiving terminal and the transmitting terminal; and
   a controller for determining whether the connection polarity of the network transmission line is correct and signaling the multiplexer correspondingly to control the connection polarity for the network transmission line, wherein the controller signals the multiplexer for maintaining the connection polarity of the network transmission line when a difference between the first number and the second number is less than a threshold value.

9. The detection circuit of claim 8 wherein the controller signals the multiplexer for switching the connection polarity of the network transmission line when a difference between the first number and the second number is greater than a threshold value.

10. The detection circuit of claim 8 wherein each signal transmitted via the network transmission line is an MLT-3 coded signal.

11. The detection circuit of claim 8 further comprising a Schmitt trigger for transforming each signal transmitted via the network transmission line into a pulse signal for counting the number for said each signal.

* * * * *